J. T. BRAYTON.
Tires for Vehicle-Wheels.

No. 157,732.  Patented Dec. 15, 1874.

Attest:
C. J. Frith
N. H. Sherburne

Inventor:
James T. Brayton

UNITED STATES PATENT OFFICE.

JAMES T. BRAYTON, OF SENECA CASTLE, NEW YORK.

IMPROVEMENT IN TIRES FOR VEHICLE-WHEELS.

Specification forming part of Letters Patent No. 157,732, dated December 15, 1874; application filed December 5, 1874.

*To all whom it may concern:*

Be it known that I, JAMES T. BRAYTON, of Seneca Castle, in the county of Ontario and State of New York, have invented a new and useful Improvement in Tires for Vehicle-Wheels; and I do hereby declare the following to be a full, clear, and exact description thereof, which will enable others skilled in the art to which it appertains to make and use the same, reference being had to the accompanying drawing forming part of this specification, in which—

Figure 1:
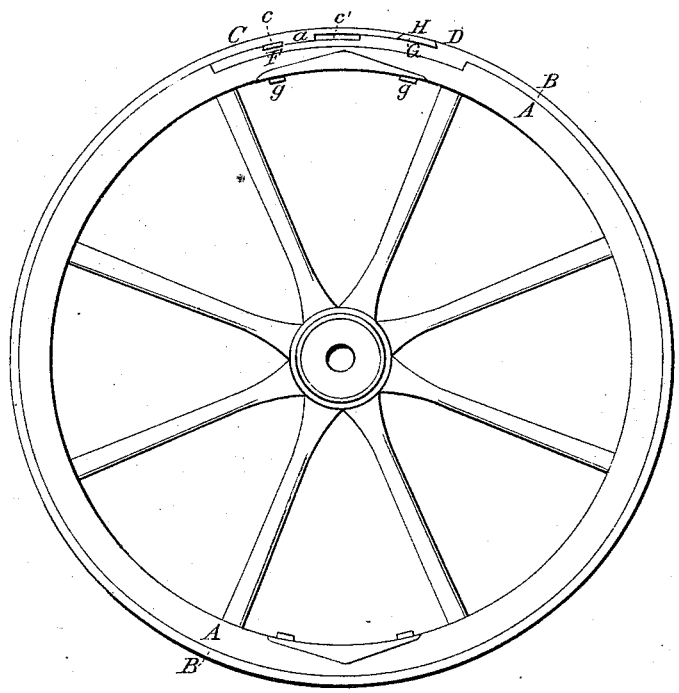
Figure 4:
Figure 5:
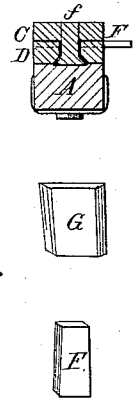
Figure 2:
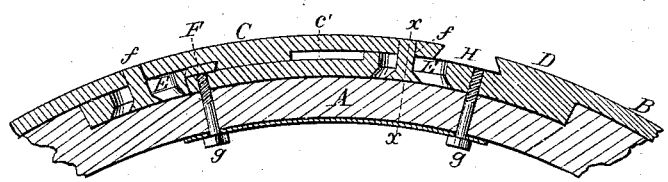
Figure 3:
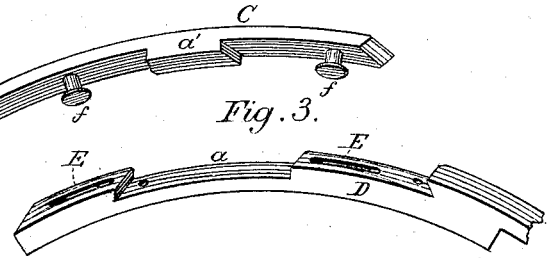

Figure 1 is a side elevation of a vehicle-wheel with my improved tire attached. Fig. 2 is a vertical central section of a portion of the felly and tire, showing the manner of securing the latter. Figs. 3 and 4 are perspective views of the two ends of the tire detached; and Fig. 5 is a transverse section of the tire and felly, taken on the line $x\ x$, drawn across Fig. 2.

Similar letters of reference indicate like parts in the several figures of the drawing.

My invention has for its object to provide a tire so arranged as to admit of being tightened so as to fit firmly against the periphery of the felly without being removed, cut, welded, and reset; and to that end it consists in the novel manner of lapping and connecting the two ends of the tire, as will be more fully understood by the following description and claim.

In the drawing, A represents the felly of the wheel, and B the tire, both of which are made in the usual form, except at the point where the ends of the tire are connected. The two ends C D of the tire are so arranged that one part shall lap over and upon the other, as shown in Fig. 2, the periphery of the felly being cut away to receive the enlarged portion of the end or part D. The periphery of the part D is provided with a recess, $a$, adapted to receive a corresponding lug or projection, $a'$, on the inner periphery of the part C. The length of this lug or projection is less than the length of the recess, and is so arranged as to form mortises $c\ c'$ between its ends and the ends of the recess, as shown in Fig. 1. The part or end D is provided with elongated mortises E E, through which are passed rivets or bolts $f f$, which take into the end or part C, connecting the two parts firmly together. The arrangement of these mortises is such as to allow the part C to move in the direction of its length, while the part or end D is firmly secured to the felly by bolts $g\ g$, passing through the same into the part D, as shown in Fig. 2. F is a tapered key, adapted to pass through the mortise $c$, as shown in Fig. 2. The arrangement of this key is such that when driven into the mortise the part or end C is moved in the direction of its length, which contracts the diameter of the tire proper, tightening the same against the periphery of the felly. It will be observed that the end C is shorter than the end D, leaving an open space, H, as shown in Fig. 2, the object of which is to insure the proper movement of the end C to secure the requisite tightness of the tire against the felly. After the tire has been properly contracted, a key, G, is then driven into space H, forming a smooth surface on the face of the tire, the shoulders or walls of the space being dovetailed to hold the key in position.

I am aware that tires have been contracted against the felly of the wheel by means of keys driven through a mortise formed through flanges on opposite sides of the tire, and a lug riveted to the inner face of tire; but such I do not claim.

Having thus described my invention, I claim—

The ends C D, to lap, and connected one to the other by the rivets $f\ f$ passing through elongated mortises E E, and connected to the felly by bolts $g\ g$ passing through the felly and end D, the end C, provided with projection $a'$, adapted to take into recess $a$ in the end D, whereby the tire is contracted by the key F, and beveled to receive key G, all combined as specified.

The above specification of my invention signed by me this 5th day of December, A. D. 1874.

JAMES T. BRAYTON.

Witnesses:
 N. H. SHERBURNE,
 A. PARKINSON.